(12) United States Patent
Lewis

(10) Patent No.: US 10,165,769 B2
(45) Date of Patent: Jan. 1, 2019

(54) ANIMAL BAIT STATION

(71) Applicant: Timothy J. Lewis, Eagle River, WI (US)

(72) Inventor: Timothy J. Lewis, Eagle River, WI (US)

( * ) Notice: Subject to any disclaimer, the term of this patent is extended or adjusted under 35 U.S.C. 154(b) by 76 days.

(21) Appl. No.: 14/818,067

(22) Filed: Aug. 4, 2015

(65) Prior Publication Data
US 2017/0035043 A1 Feb. 9, 2017

(51) Int. Cl.
*A01M 25/00* (2006.01)

(52) U.S. Cl.
CPC ................ *A01M 25/004* (2013.01)

(58) Field of Classification Search
CPC ... A01M 25/00; A01M 25/002; A01M 25/004
USPC .......................................................... 43/131
See application file for complete search history.

(56) References Cited

U.S. PATENT DOCUMENTS

| | | | |
|---|---|---|---|
| 890,430 A * | 6/1908 | Mann ........................... 43/131 |
| 1,302,160 A * | 4/1919 | Hedrich ....................... 43/131 |
| 1,471,954 A * | 10/1923 | Greenway ........... A01M 25/004 43/131 |
| 1,579,512 A * | 4/1926 | Bushong ............. A01M 25/004 43/131 |
| 2,736,127 A * | 2/1956 | McCann .............. A01M 25/004 43/131 |
| 2,912,788 A * | 11/1959 | Hargrove ............. A01M 25/004 43/131 |
| 3,303,600 A * | 2/1967 | Freeman ............. A01M 25/004 119/63 |
| 3,427,743 A * | 2/1969 | Brunner .............. A01M 1/2005 43/131 |
| 3,978,607 A * | 9/1976 | Piere ................... A01M 25/004 294/91 |
| 4,160,513 A * | 7/1979 | Cockerham ......... A47K 5/1211 222/181.2 |
| 4,208,829 A * | 6/1980 | Manning ............. A01M 25/004 43/131 |

(Continued)

FOREIGN PATENT DOCUMENTS

| | | | | |
|---|---|---|---|---|
| DE | 3905489 A1 * | 8/1990 | ......... A01M 25/004 |
| DE | 3921865 A1 * | 1/1991 | ......... A01M 25/002 |

(Continued)

OTHER PUBLICATIONS

UT Eaton Top Loader Bait Station, downloaded from Internet on Jan. 3, 2015, 3 pages.

(Continued)

*Primary Examiner* — Darren W Ark
(74) *Attorney, Agent, or Firm* — Thomas D. Wilhelm; Northwind IP Law, S.C.

(57) ABSTRACT

A bait station for feeding toxic bait to pest animals. The bait station is a generally enclosed structure having one or more open entrances where a pest animal can enter the bait station and feed on toxic bait at a feeding location. Blocking members are disposed in the conduits leading from an entrance to the feeding location. The blocking members prevent the feeding animal from removing bait in stick form from the bait station, and can optionally extend down, outside the bait station, such that the extensions of the blocking members can be used to anchor the bait station to the ground.

43 Claims, 4 Drawing Sheets

(56) References Cited

U.S. PATENT DOCUMENTS

| | | | | |
|---|---|---|---|---|
| 4,364,194 A * | 12/1982 | Clark, Sr. | A01M 25/004 43/131 |
| 4,375,732 A * | 3/1983 | Waast | A01M 25/004 43/131 |
| 4,400,904 A * | 8/1983 | Baker | A01M 25/004 43/131 |
| 4,413,440 A * | 11/1983 | Schultz | A01M 25/006 111/95 |
| 4,497,131 A * | 2/1985 | Hicks | A01M 25/002 43/131 |
| 4,630,392 A * | 12/1986 | Ferraro | A01M 25/004 43/131 |
| 4,662,104 A * | 5/1987 | Mather | A01K 1/0152 43/131 |
| 4,663,882 A * | 5/1987 | Koljonen | A01M 25/002 424/410 |
| 4,746,033 A * | 5/1988 | Morellini | A01M 25/00 222/129 |
| 5,027,548 A * | 7/1991 | Anderson | A01M 25/002 43/124 |
| 5,170,584 A * | 12/1992 | Perry | A01G 13/105 43/107 |
| 5,622,001 A * | 4/1997 | Kazmierzak | A01M 25/004 43/107 |
| 5,987,811 A * | 11/1999 | Wiesener | A01M 25/004 43/131 |
| 6,145,242 A * | 11/2000 | Simpson | A01M 1/2011 43/131 |
| 6,374,536 B1 * | 4/2002 | Washburn | A01M 1/026 43/131 |
| D485,597 S * | 1/2004 | Turner | D22/119 |
| 6,901,694 B1 * | 6/2005 | Neault | A01M 1/2011 43/131 |
| 6,910,300 B1 * | 6/2005 | Warren | A01M 25/004 43/131 |
| 9,663,068 B1 * | 5/2017 | Sykora | A01M 25/004 |
| 9,877,471 B2 * | 1/2018 | Takacs | A01M 29/16 |
| 2004/0088903 A1 * | 5/2004 | Poche | A01M 25/004 43/61 |
| 2005/0132637 A1 * | 6/2005 | Deakins | A01M 25/004 43/131 |
| 2010/0257774 A1 * | 10/2010 | Middlebrook | A01M 25/004 43/131 |
| 2012/0233908 A1 * | 9/2012 | Drake | A01M 25/004 43/131 |
| 2014/0059919 A1 * | 3/2014 | Pupello | A01M 25/004 43/131 |
| 2014/0196357 A1 * | 7/2014 | Firth | A01M 25/006 43/131 |
| 2016/0015021 A1 * | 1/2016 | Green | A01M 25/004 43/58 |
| 2016/0309698 A1 * | 10/2016 | Sykora | A01M 25/004 |
| 2017/0295773 A1 * | 10/2017 | Michalski | A01M 25/004 |

FOREIGN PATENT DOCUMENTS

| | | | | |
|---|---|---|---|---|
| DE | 3921867 A1 * | 1/1991 | | A01M 25/002 |
| DE | 4134678 | 10/1992 | | |
| DE | 4134678 A1 * | 10/1992 | | A01M 25/004 |
| DE | 4431694 A1 * | 3/1996 | | A01M 23/16 |
| DE | 19613008 A1 * | 11/1996 | | A01M 25/004 |
| DE | 10208138 A1 * | 9/2003 | | A01M 25/004 |
| EP | 388349 A2 * | 9/1990 | | |
| EP | 599755 A1 * | 6/1994 | | |
| FR | 2557425 A1 * | 7/1985 | | A01M 25/004 |
| FR | 2750573 A1 * | 1/1998 | | A01M 25/002 |
| GB | 2096446 | 10/1982 | | |
| GB | 2096446 A * | 10/1982 | | A01M 25/004 |
| GB | 2249249 A * | 5/1992 | | A01M 25/004 |
| WO | WO-8203968 A1 * | 11/1982 | | A01M 25/004 |
| WO | WO-2004098281 A1 * | 11/2004 | | A01M 25/004 |

OTHER PUBLICATIONS

Photos of front and end views of bait stations, Jan. 29, 2015, 2 pages.

* cited by examiner

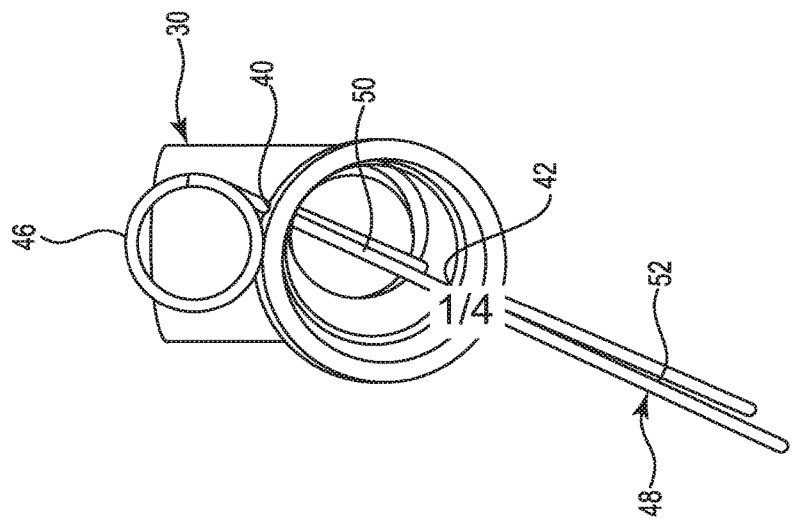
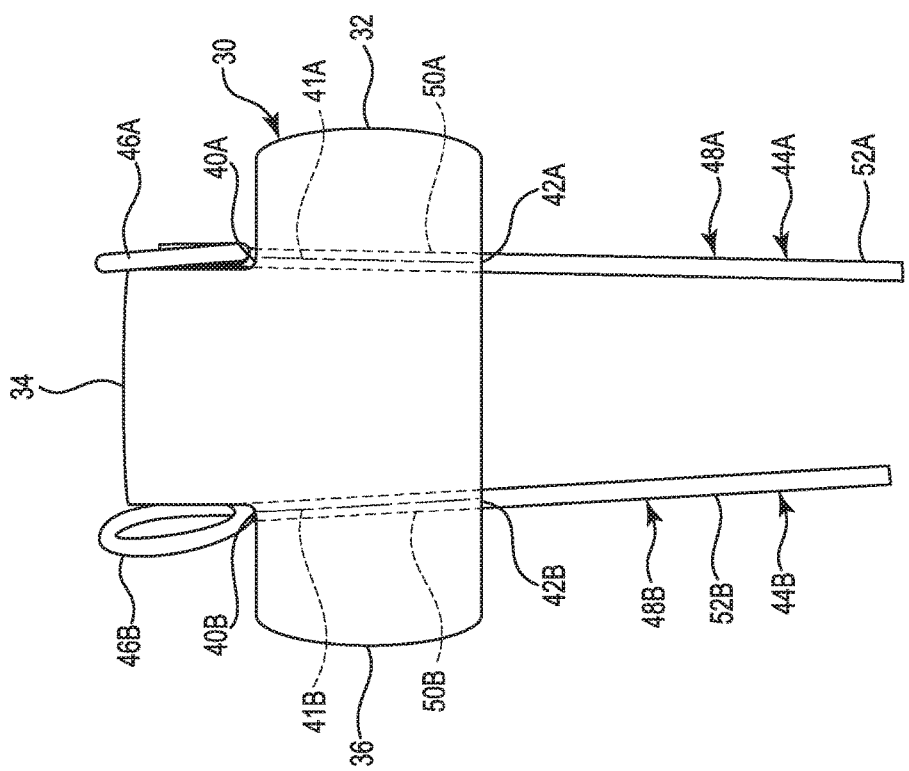

ANIMAL BAIT STATION

BACKGROUND OF THE INVENTION

This invention relates to control of rodents and similar animal pests. Control of such pests is highly desirable because such animals tend to carry disease and/or parasites, tend to contaminate food, tend to feed upon and destroy crops, tend to enter homes and other buildings, and to feed on food and other valuable items in the buildings.

The number of rodents which may infest an area presents the opportunity to use substantial quantities of bait toxic to such animals in order to stock a bait station for several days of feeding.

There have been proposed a number of bait stations which generally house a toxic bait, keeping the bait out of the ambient environment in order to avoid degradation of the bait by rain water or other atmospheric conditions. When bait is placed in such bait stations, the animal enters the structure in order to be able to reach and feed on the bait.

The bait used in such structures may be a pelletized product which is easy for the animal to pick up and eat. It is also known to use such pelletized bait by placing the bait in an open container such as a shallow tray, a cup, a bowl, an open box, or the like.

A problem encountered with use of pelletized baits is that the animals for which such bait is intended, such as voles, mice, rats, and the like tend to carry food, which they don't need for immediate consumption, to a storage location away from where the food was found. Accordingly, one of the drawbacks to using a pelletized bait in a bait station is that the animals tend to carry some of the bait away, such that a portion of the bait placed in the bait station is stored rather than being consumed. And so that portion of the bait which is carried away does not contribute to solving the objective of eliminating as many of the animals as possible as soon as possible.

In order to counter the tendency for the animal to carry the food away from a bait station, manufacturers of such toxic baits have provided the bait in chunk form, both as generally cubic blocks and as elongate blocks of bait, sometimes called bait sticks.

Especially the smaller cubic blocks are small enough that a determined animal can still carry away a block, or at least a portion of the block, when a significant portion (e.g. half) of the block has been consumed. While it is known to use the smaller cubic blocks in an enclosed bait station, with any use of cubic blocks, the situation can in fact be worse than use of pelletized bait because a larger piece of bait (larger than a pellet) can, at some point in the consumption of the block, be carried away by an animal.

However, the larger blocks do present a benefit in that a greater quantity of the bait must be consumed before an animal is able to carry away the remaining portion of the block.

It is also known that animals can dislocate, dislodge a bait station from a desired location, either moving the bait station from the desired location or tipping the bait station into an unusable orientation.

There is a need, therefore, for animal bait stations to be securely anchored to an underlying soil surface, and to provide access for the animal to be able to reach the toxic bait, and to prevent, or at least impede, the animal from removing large chunks or blocks of the bait from the bait station.

The bait station should also confine the bait to an interior portion of the bait station, and the entrance to the bait station should be sized in order to limit access to the bait to the small animals for which it is intended, thereby to make difficult, or impossible, entry or access by other than the pest animals for which the bait station is intended. Thus, the bait station structure should be such that children cannot easily access the bait in the bait station.

SUMMARY OF THE DISCLOSURE

This invention provides a bait station for feeding toxic bait to pest animals. The bait station is a generally enclosed structure having one or more open entrances where a pest animal can enter the bait station and feed on the toxic bait at a feeding location. A food reserve conduit feeds a toxic bait in stick form to the feeding location. Blocking members are disposed in the conduits leading from an entrance to the feeding location. The blocking members prevent the feeding animal from removing the bait stick from the bait station, and can optionally extend down, outside the bait station, such that the extensions of the blocking members can be used to anchor the bait station to the ground.

In a first family of embodiments, the invention comprehends an animal bait station, comprising at least a first feeding conduit, defined by a first sidewall extending about a first communication corridor, the first feeding conduit having a top and a bottom, and a first open end; a food reserve conduit defined by a second sidewall extending about a second communication corridor, the food reserve conduit extending away from the first feeding conduit; a feeding location being defined proximate a locus of closest approach of the first feeding conduit and the food reserve conduit, the food reserve conduit having a second end remote from the feeding location, the first and second communication corridors defining a common communication path extending collectively through both the first feeding conduit and the food reserve conduit, to the feeding location; and a blocking member in the communication path between the feeding location and the first open end of the first feeding conduit.

In some embodiments, the blocking member extends across the communication path and effectively prevents an animal from removing bait in stick form from the bait station through the first feeding conduit.

In some embodiments, the blocking member extends across the communication path, from proximate a top of the communication path to proximate a bottom of the communication path.

In some embodiments, an anchor segment of said blocking member extends out of the first feeding conduit in a direction whereby, when the anchor segment is inserted into underlying soil having a horizontal surface, with the anchor segment extending down from the feeding conduit far enough to anchor the bait station to the underlying soil, the second end, of the food reserve conduit is at a first elevation higher than a second elevation of the feeding location.

In some embodiments, the blocking member extends through a first hole proximate the top of a sidewall along the communication path between the feeding location and the first open end, across the communication corridor and out the respective sidewall through a second hole proximate the bottom of the respective sidewall, and further extends beyond the bottom of the respective sidewall far enough to be effectively used to anchor the animal bait station to underlying soil such that the bait station is not easily moved laterally from such anchorage.

In some embodiments, the blocking member is positioned so as to divide a cross-section of the communication corridor into first and second cross-section portions and at least one of the first and second cross-section portions is large enough, and the blocking member is close enough to the feeding location, to allow an animal for which such bait station was intended, to reach and feed at the feeding location.

In some embodiments, a bait in stick form is in the bait station, with an end of the bait in stick form located at the feeding location, the combination of configuration of the bait in stick form, and the positioning of the blocking member to define the first and second cross-section portions, effectively preventing removal of the bait from the bait station past the blocking member.

In some embodiments, the bait station further comprises a second feeding conduit, defined by a second sidewall extending about an extension of the communication corridor, the second feeding conduit having a top and a bottom, and a third end, open and remote from the feeding location, and extending from the feeding location to the third open end, the communication corridor extending through both of the first and second feeding conduits.

In some embodiments, the bait station further comprises a second blocking member in the communication corridor in the second feeding conduit, between the feeding location and the third open end of the second feeding conduit, the second blocking member effectively preventing an animal from removing the bait in stick form from the bait station through the second feeding conduit.

In some embodiments, the second blocking member extends across the communication corridor in the second feeding conduit, optionally from proximate a top of the communication corridor to proximate a bottom of the communication corridor.

In some embodiments, an anchor segment of the second blocking member extends down from the second feeding conduit in a direction whereby, when the anchor segment is inserted into underlying soil having a horizontal surface, far enough to anchor the bait station to the underlying soil, the second end, of the reserve conduit, is held at a third elevation higher than the second elevation of the feeding locating.

In some embodiments, the second blocking member extends through a third hole proximate the top of the second feeding conduit, across the communication corridor and out of the second feeding conduit through a fourth hole proximate the bottom of the second feeding conduit, and further extends beyond the bottom of the second feeding conduit far enough to be effectively used to anchor the animal bait station to underlying soil such that the bait station is not easily moved laterally from the anchorage.

In some embodiments, the second blocking member is positioned so as to divide a cross-section of the communication corridor into third and fourth cross-section portions in the second feeding conduit, and at least one of the third and fourth portions is large enough, and the second blocking member is close enough to the feeding location, to allow an animal for which the bait station is intended, to reach and feed at the feeding location.

In some embodiments, the bait station further comprises a bait in stick form in the communication corridor, at the feeding location, the combination of configuration of the bait in stick form, and the positioning of the second blocking member to define the third and fourth cross-section portions, effectively prevents removal of the bait from the bait station past the second blocking member.

In a second family of embodiments, the invention comprehends an animal bait station body, comprising at least a first feeding conduit, defined by a sidewall extending about a communication corridor, the first feeding conduit having a top and a bottom, and a first open end; a food reserve conduit extending upwardly from a feeding location proximate the first feeding conduit and having a second end remote from the feeding location, the communication corridor extending in common through both the first feeding conduit and the food reserve conduit such that any bait material in the food reserve conduit can move, along the communication corridor, from an initial location in the food reserve conduit, to the feeding location at the intersection of the first feeding conduit and the food reserve conduit; and a first hole at a first perimeter location, at a first location along an axis of the first feeding conduit, through the sidewall of the first feeding conduit and a second hole at a second perimeter location, across from the first perimeter location and at the same axial location, through the sidewall of the first feeding conduit.

In some embodiments, a single straight line axis extends through both of the first and second holes.

In some embodiments, the bait station body further comprises a blocking member extending through the first hole, across the communication corridor and through the second hole.

In some embodiments, the bait station further comprises a bait in stick form in the communication corridor at the feeding location, the combination of configuration of the bait in stick form, and the positioning of the blocking member to define the first and second cross-section portions, effectively preventing removal of the bait from the bait station past said blocking member.

In some embodiments, the bat station further comprises a second feeding conduit, defined by a second sidewall extending about an extension of the communication corridor, the second feeding conduit having a top and a bottom, and a third end, open and remote from the feeding location, the second feeding conduit extending from the feeding location to the third open end, the communication corridor extending through both of the first and second feeding conduits, a third hole being disposed at or proximate the top of the second sidewall of the second feeding conduit and a fourth hole being disposed at or proximate the bottom of the second sidewall of the second feeding conduit, and optionally a second straight line axis extends through both of the third and fourth holes.

In some embodiments, the bait station further comprises a second blocking member extending through the third hole, across the communication corridor and into the fourth hole.

In a third family of embodiments, the invention comprehends an animal bait station, comprising a first feeding conduit, defined by a first sidewall extending about a first communication corridor, the first feeding conduit having a first open end and a second end; a food reserve conduit having a second sidewall extending about a second communication corridor, the food reserve conduit extending away from the first feeding conduit, and having a third end proximate the first feeding conduit and a fourth end remote from the first feeding conduit; a second feeding conduit, defined by a third sidewall extending about a third communication corridor, the second feeding conduit having a fifth end proximate the first feeding conduit and the food reserve conduit, and a sixth end remote from the first feeding conduit and the food reserve conduit; a feeding location being defined proximate a combination of respective second, third, and fifth ends of the feeding conduits and the food reserve conduit, the first, second, and third communication corridors defining a common communication path extending collectively through both of the first and second feeding conduits and the food reserve conduit; a first blocking member being disposed in the communication path between the feeding location and the first open end of the first feeding conduit; and a second blocking member being disposed in the communication path between the feeding location and the third open end of the second feeding conduit.

In some embodiments, the blocking members extend across the respective communication corridors and effectively prevent an animal from removing bait in stick form from the bait station through the first or second feeding conduit.

In some embodiments, the bait station further comprises a bait in stick form in the food reserve conduit, at the feeding location, the combination of configuration of the bait in stick form, and the positioning of the blocking member, effectively preventing removal of the bait from the bait station past the blocking member.

In a fourth family of embodiments, the invention comprehends an animal bait station kit, comprising at least a first feeding conduit, defined by a first sidewall extending about a first communication corridor, the first feeding conduit having a top and a bottom, and first and second open ends; a food reserve conduit, defined by a second sidewall extending about a second communication corridor, the food reserve conduit having third and fourth open ends, and being adapted to be assembled, with the first feeding conduit, in providing a such bait station, and to extend, in the assembly, upward from an elevation of the first feeding conduit to the fourth end; a connector conduit having a top and a bottom, the connector conduit being defined by a plurality of sidewalls having a plurality of open ends, the plurality of sidewalls extending about a plurality of connector communication corridors, at least first and second ones of connector communication corridors meeting at at least one corridor junction, the open end of a first sidewall of a first connector communication corridor being adapted to receive the second open end of the first feeding conduit, and the open end of a second sidewall of a second connector communication corridor being adapted to receive the third open end of the food reserve conduit, a feeding location being defined in the connector conduit; and at least one blocking member adapted to extend across a such communication corridor in one of the first feeding conduit and the connector conduit between the feeding location and the first open end, the blocking member, when assembled with the other members of the kit, effectively preventing an animal from removing a bait stick from the bait station through the first feeding conduit, while allowing the animal to reach, and feed on, the bait stick, the bait stick being adapted to be received into the food reserve conduit, and being sized and configured to extend substantially across at least a first dimension between first and second interior surfaces of opposing portions of the sidewall of the food reserve conduit.

In some embodiments, the bait station kit further comprises a cap adapted to be removably mounted over, and thus to close, the fourth open end of the food reserve conduit.

In some embodiments, the first communication corridor, the second communication corridor, and at least the two communication corridors in the connecting conduit which receive the first feeding conduit and the food reserve conduit extending in common with each other as a single communication path.

In some embodiments, the blocking member, when assembled with the other members of the kit, also extends down from the bottom of the respective connector conduit or feeding conduit so as to anchor the bait station to underlying soil.

In some embodiments, the blocking member extends through a first hole proximate the top of the first sidewall, across the communication path and out of the first feeding conduit through a second hole proximate the bottom of the first sidewall, and further extends beyond the bottom of the first feeding conduit far enough to be effectively used to anchor the animal bait station to underlying soil such that the bait station is not easily moved laterally from the respective anchorage.

In some embodiments, the bait station further comprises a second feeding conduit, defined by a second feeding conduit sidewall extending about an additional communication corridor, the second feeding conduit having a top and a bottom, and fifth and sixth open ends, and adapted to be mounted, at the fifth open end of the second feeding conduit, to the connector conduit at one of the open ends of the connector conduit, and to extend from the respective open end of the connector conduit, adjacent the feeding location, to the sixth open end of the second feeding conduit, the communication path extending through both of the first and second feeding conduits.

In some embodiments, the bait station kit further comprises a second blocking member, adapted to being inserted into the communication path between the feeding location and the sixth open end of the second feeding conduit, the second blocking member, when so inserted, effectively preventing an animal from removing the bait stick from the bait station through the second feeding conduit.

In some embodiments, the second blocking member when so inserted, extends through a third hole proximate the top of the second feeding conduit, across the communication path and out of the second feeding conduit through a fourth hole proximate the bottom of the second feeding conduit, and further extending beyond the bottom of the second feeding conduit far enough to be effectively used to anchor the animal bait station to underlying soil such that the bait station is not easily moved laterally from the anchorage.

In some embodiments, the bait stick comprises an elongate bait stick adapted to be received into the food reserve conduit and, when so in the food reserve conduit, to extend to the feeding location, the combination of configuration of the bait stick, and the positioning of the second blocking member, effectively preventing removal of the bait from the bait station past the second blocking member.

In a fifth family of embodiments, the invention comprehends a method of presenting a toxic bait for consumption by pest animals, the method comprising providing a bait station having at least a first feeding conduit having a first open end, a food reserve conduit having a second open end, a communication corridor extending through both the first feeding conduit and the food reserve conduit, between the first and second ends, a feeding location in the communication corridor between the first open end and the second open end, a blocking member extending across the communication corridor between the feeding location and the first open end, and an anchor extending down and away from the first feeding conduit; the method further comprising selecting a baiting location; driving the anchor segment of the blocking member into underlying soil at the baiting location; and providing a toxic bait at the feeding location.

In some embodiments, the bait station comprises a second feeding conduit, the communication corridor also extending through the second feeding conduit, and a second blocking member in the second feeding conduit between the feeding location and an open end of the second feeding conduit.

In some embodiments, the providing of the toxic bait at the feeding location comprises providing an elongate bait in stick form at the feeding location such that the elongate bait extends from the feeding location upwardly into the food reserve conduit, and advances by gravity toward the feeding location as bait material is removed from the bait stick by animals feeding on the bait at the feeding location.

BRIEF DESCRIPTION OF THE DRAWINGS

FIG. 2 is a side elevation view of a T-section, with anchor pins, useful in an animal bait station of FIG. 1.

FIG. 3 is an end view of the T-section and anchor pins of FIG. 2.

DETAILED DESCRIPTION OF THE ILLUSTRATED EMBODIMENTS

Figure 1:
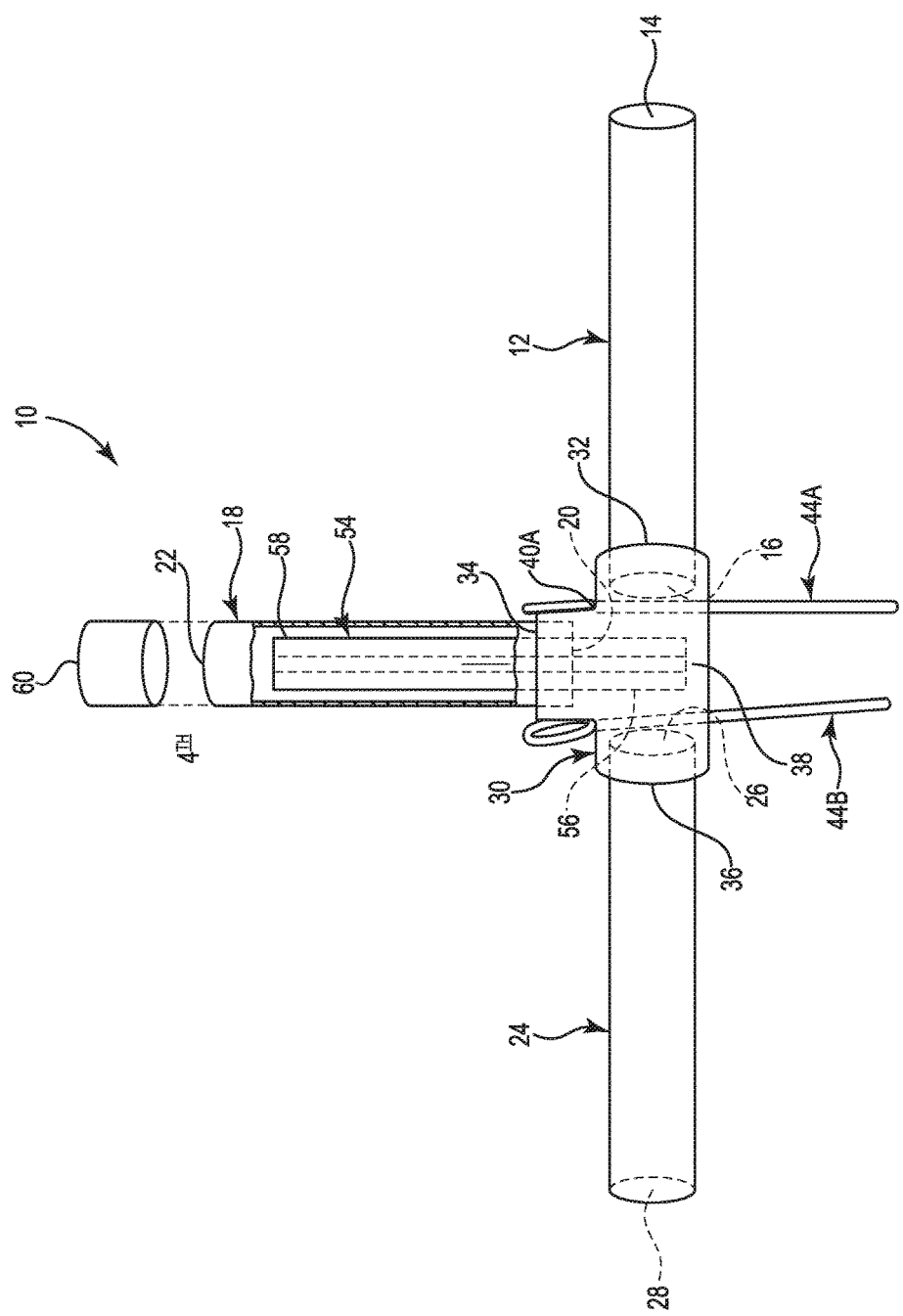
FIG. 1 is a front elevation view, with part cut away, of an animal bait station of the invention.

Turning now to FIG. 1, a bait station of the invention is generally designated as 10. Bait station 10 has a first feeding conduit 12 having a first right end 14 and a second left end 16.

A food reserve conduit 18 has a third lower end 20 and a fourth upper end 22. A second feeding conduit 24 has a fifth right end 26 and a sixth left end 28.

A connector conduit 30 has a seventh right end 32, an eighth upper end 34, and a ninth left end 36.

A feeding location 38 is located generally in the center of the connector conduit between the right and left ends 32 and 36.

Referring to FIG. 2, first and second top holes 40A, 40B are located at the top of the connector conduit on opposing sides of the eighth upper end 34 of the connector conduit. First and second bottom holes 42A, 42B are located at the bottom of the connector conduit below holes 40A and 40B. The axes 41A of holes 40A and 42A on the right side of the connector conduit are generally aligned with each other and constitute a single continuous straight-line axis. Similarly, the axes 41B of holes 40B and 42B on the left side of the connector conduit are generally aligned with each other and constitute a single continuous straight-line axis.

Referring still to FIG. 2, a first anchor pin 44A on the right side of the connector conduit has a handling portion 46A and an extending portion 48A. Extending portion 48A has a blocking segment 50A and an anchor segment 52A.

A second anchor pin 44B on the left side of the connector conduit has a handling portion 46B and an extending portion 48B. Extending portion 48B has a blocking segment 50B and an anchor segment 52B. Anchor segments 52A, 52B extend far enough below the connector conduit to prevent the bait station from being easily moved laterally. Rather, movement of the bait station typically requires lifting the anchor pins or lifting the bait station body, when the full lengths of the anchor segments have been driven into underlying soil.

As illustrated, anchor pin 44A extends in a straight line through the top and bottom holes 40A, 42A on the right side of the connector conduit. Anchor pin 44B extends in a straight line through the top and bottom holes 40B, 42B on the left side of the connector conduit.

Figure 2A:
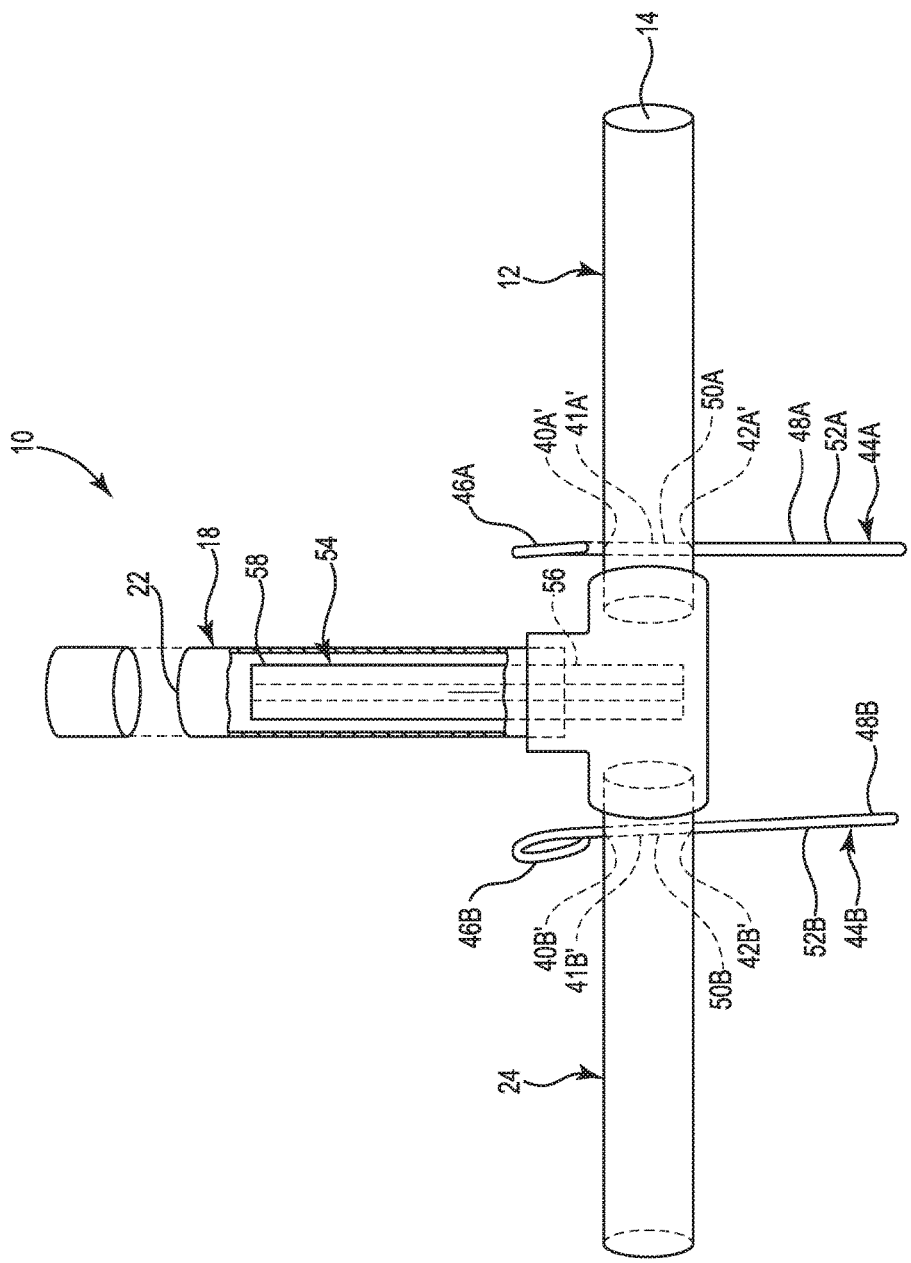
FIG. 2A is a front elevation view as in FIG. 1, showing a second embodiment of an animal bait station of the invention wherein the anchor pin holes, and the anchor pins, extend through the first and second feeding conduits.

Referring to FIG. 2A, first and second top holes 40A', 40B' are located at the tops of the respective first and second feeding conduits 12, 24, adjacent, but displaced from, the left and right sides of the connector conduit. First and second bottom holes 42A', 42B' are located at the bottoms of the respective first and second feeding conduits 12, 14, adjacent but displaced from, the left and right sides of the connector conduit. The axes 41A' of holes 40A' and 42A' on the right side of the connector conduit are generally aligned with each other and constitute a single continuous straight-line axis. Similarly, the axes 41B' of holes 40B' and 42B' on the left side of the connector conduit are generally aligned with each other and constitute a single continuous straight-line axis.

As in the embodiment of FIG. 1, first anchor pin 44A on the first feeding conduit has handling portion 46A and extending portion 48A. Extending portion 48A has blocking segment 50A and anchor segment 52A.

Second anchor pin 44B on the second feeding conduit has handling portion 46B and extending portion 48B. Extending portion 48B has blocking segment 50B and anchor segment 52B.

Anchor segments 52A, 52B extend far enough below the respective first and second feeding conduits to prevent the bait station from being easily moved laterally. Rather, movement of the bait station typically requires lifting the anchor pins, or lifting the bait station housing, when the full lengths of the anchor segments have been driven into underlying soil.

As illustrated, anchor pin 44A extends in a straight line through the top and bottom holes 40A', 42A' in the first feeding conduit. Similarly, anchor pin 44B extends in a straight line through the top and bottom holes 40B', 42B' in the second feeding conduit.

Looking at the individual conduits separately, each of the first feeding conduit 12, the food reserve conduit 18, and the second feeding conduit 24 is a hollow tube defined by a respective sidewall which extends about a respective communication corridor.

Connector conduit 30 is defined by a plurality of sidewalls which merge with each other to form a "T"-shaped connector extending from and between the respective seventh, eighth, and ninth open ends, collectively defining a connector communication corridor. When the respective conduits are assembled to each other as illustrated in FIG. 1, the respective communication corridors merge with each other to form a single common communication path among the four conduits.

An elongate bait stick 54, toxic to the animals which the user wishes to eliminate, has a lower end 56 at feeding location 38, and extends upwardly in the communication corridor of the food reserve conduit to an upper end 58 proximate the top of the food reserve conduit. A cap 60 is mounted over the top of the food reserve conduit, thus closing off the top of the food reserve conduit to ambient atmosphere.

Thus, each of the first and second feeding conduits and the food reserve conduit is a hollow tube. The cross-section of the space inside the respective feeding conduits/tubes is large enough to readily admit entrance of a mouse, vole, or other animal for which the bait station is intended. The cross-sections of the feeding conduits are small enough to not allow larger animals, for which the toxic bait is not intended, to enter the conduits. Plus, the lengths of the feeding conduits are great enough that children cannot reach the toxic bait with their small arms or fingers. Thus, small animals can be poisoned, eliminated without putting at risk larger animals or children.

Referring to FIG. 3, the blocking segment 50 of an anchor pin typically traverses approximately the middle of the communication corridor, top to bottom, dividing the respective communication corridor into left and right sections, thus reducing the effective cross-section of the feeding corridor which can be traversed by an animal at that point by approximately half. The cross-section of the feeding conduit is generously sized to allow the feeding animal, or at least the head of the animal, to reach beyond the blocking segment, thus to feed on the bait. However, the cross-section of the feeding conduit is also sized to not allow passage of the relatively rigid, generally not deformable, bait stick.

In a typical embodiment, the cross-section of the feeding conduit is sized to readily admit the target animals, but typically to not allow the target animals to freely traverse the entirety of the animal's body past the blocking segment of the anchor pin. However, the blocking segment is close enough to the feeding location that the animal can get his/her head past the anchor pin such that the animal's head is able to reach, and to feed on, the bait at the feeding location.

In addition, use of the elongate bait stick in bait stations of the invention provides further advantages. First, there are few, if any, small pieces of bait for a child to ingest—only those broken off or bitten off and not taken by a feeding animal. The bait station is intended to be anchored to underlying soil. So to the extent bits of the bait have been bitten off and left lying in the respective feeding conduit, it is less likely that a child can access such small pieces by upending the bait station whereby such small pieces might otherwise have fallen out of the bait station by the action of gravity.

The bottom of the bait stick rests on the bottom of the connecting conduit, and extends upwardly into the food reserve corridor. At least one of the dimensions of the cross-section of the bait stick approximates a respective dimension of the inside cross-section of the food reserve conduit such that the bait stick extends across substantially the entirety of a cross-dimension of the food reserve conduit. The bait stick, being rigid, cannot negotiate the turn from the vertical orientation of the food reserve conduit to the horizontal orientation of the feeding conduits whereby a potentially feeding animal cannot carry the bait stick away from the feeding location.

Still further, even if the animal were successful in getting the bait stick around the corner and moving toward one of the open ends of a respective feeding conduit, the bait stick would still be blocked from leaving the "T"-section when the bait stick reached the blocking segment of the respective anchor pin. In general, the blocking segment of the anchor pin reduces the cross-section of the respective corridor in at least one dimension, at the blocking segment, to a cross-section too small to allow the rigid bait stick to pass. However, the body of a typical target animal, such as a mouse, is quite conformable, deformable such that a mouse can often pass obstacles which the more rigid bait stick body cannot get past.

Anchor segments 52 of the anchor pins are generally, more or less, aligned with the food reserve conduit such that when the anchor pins are driven into the underlying soil, the food reserve conduit is sufficiently upright in orientation that the bait stick moves progressively down automatically by gravity toward the feeding location as animals feed on, and eliminate, that bottom portion of the bait stick which is exposed below the top of the interior surface of the "T"-section at the feeding location.

The three conduits 12, 18, 24 can be readily made using a wide variety of materials, including wood, metal, or plastic. Extruded plastic tubing is convenient, given that such tubing is easily cut, drilled, and bonded. Examples of plastic materials which are readily so fabricated are extruded plastic tubes, pipes of the appropriate size for the target animal, made using plastic formulations commonly known as polyvinyl chloride (PVC) or polyvinylidene chloride (PVDC), available at e.g. home improvement stores. The "T"-section and cap are similarly available from the same suppliers. The pipe is cut to the desired lengths for the conduits. The conduits are inserted into the "T"-section openings, and may be bonded, or not, to the "T"-section using adhesive appropriate for the respective plastic. The cap is mounted on the food reserve conduit after a bait stick is inserted into the food reserve conduit. The cap is left removable so that additional bait sticks can be inserted into the food reserve conduit after the first bait stick is consumed.

While conduits circular in cross-section are illustrated in the drawings, the conduit cross-section profiles can have other shapes as desired, such as square or rectangular, or any other desired shape.

Holes 40, 42 are drilled in the "T"-section using a conventional drill and drill bits.

Any rigid pins, nails, rods, or the like can be used for anchor pins 44A, 44B so long as the anchor pins are sufficiently rigid to stay straight as the pins are pushed into the underlying soil. Typically, such anchor pins will be metal, such as steel. Nails, available from a hardware store, are also acceptable for use as anchor pins 44A, 44B. Typically, such pin will have a head or other handling portion. Longer, and relatively thinner, pins can be obtained from the garden center of a hardware store or home improvement store.

A bait station of the invention can be provided as a kit. Such kit includes a first, optionally a second, feeding conduit, the food reserve conduit, the connector conduit such as a "T"-section, or just an elbow, the anchor pin or pins, the cap, and optionally one or more bait sticks. Typically, the feeding conduit or conduits and the food reserve conduit all have the same cross-section dimensions and the same lengths. Such kit is assembled by pushing the two or three conduits into the respective two or three openings in the connector conduit or elbow, inserting a bait stick into the food reserve conduit, mounting the cap on the open end of the food reserve conduit to keep out rain and other atmospheric conditions, and inserting the anchor pin or pins into holes 40, 42.

With the bait station so assembled, the bait station can be used as follows. The user selects a location which is frequented by animals of interest. The bait station is positioned at the selected location by pushing the anchor pin or pins into the underlying soil at the selected location, ensuring that the top of the food reserve conduit is at an elevation sufficiently higher than the feeding location so the bait stick will automatically feed downwardly by gravity toward the feeding location as the bait stick is consumed by feeding animals. Preferably, the food reserve conduit is in a generally upright orientation.

Holes 40, 42, and respectively anchor pins 44, can be positioned anywhere along the length of the communication path between the feeding location and the openings at the ends of the respective feeding conduits. It is desirable, but not required, that a given pair of holes 40, 42, relative to each other, be generally aligned, in a common direction, with food reserve conduit 18 so the anchor pins, when driven into the underlying soil, will hold the food reserve conduit in an upright orientation which ensures a gravity feed of the bait stick.

While a single feeding conduit has been discussed, and two feeding conduits have been illustrated, greater than 2 feeding conduits can be used so long as a suitable connecting conduit, or multiple connecting conduits, are provided. Further, multiple food reserve conduits, and thus multiple feeding locations, can be used, with connecting communication conduits between respective connector conduits. In such structure, blocking members are disposed between the respective feeding locations along any communication path which leads to an open end/entrance/exit where an animal could otherwise remove bait material from the bait station.

A single pin 44 has been illustrated as serving the purpose of both a blocking member to prevent removal of the bait stick, and as an anchor pin for anchoring the bait station to the ground. The invention contemplates that the anchoring feature can be structurally separated from the blocking feature. Accordingly, one or more blocking pins can be inserted through holes in the feeding conduit at any angle, at any point along the length of the feeding conduit in order to optimize the blocking function. In some such instances, a such blocking pin may not extend at a suitable angle to keep the food reserve conduit upright if also used as anchor pin, such that the blocking pin does not well serve as an anchor pin. Or the blocking pin may be too short to serve as an anchor pin. In such instance a separate anchor pin, of suitable length and design, can be secured to the feeding conduit or to the connector conduit, or otherwise mounted to or over the feeding conduit or connector conduit, or may otherwise connect to the bait station; for example, a conventional anchor structure may be used, in order to enable the user to anchor the bait station to the underlying soil.

Figure 4:
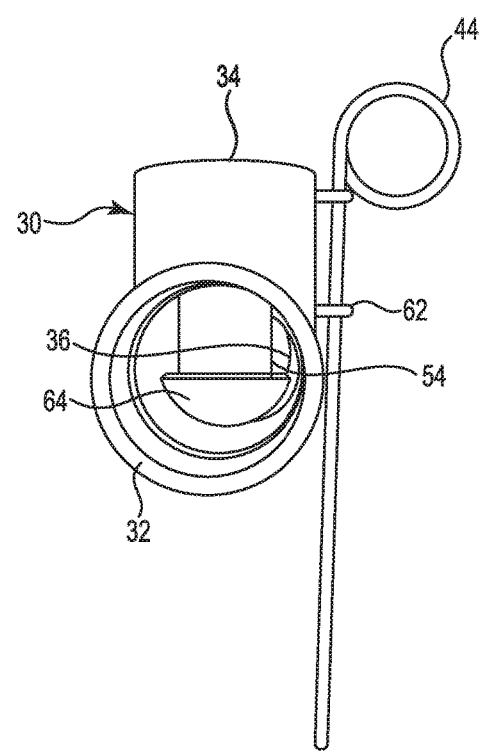
FIG. 4 is an end view of the T-section showing a dam as a blocking member, the lower end of a bait stick behind the dam, and an anchor pin mounted to the outside of the T-section.

As an illustration of the separation of the blocking function from the anchoring function, FIG. 4 shows T-section connector conduit 30 having an anchor pin 44 mounted to the outside of the connector conduit through upper and lower anchor eyes 62; while a blocking member in the form of a blocking dam 64 extends, as a cord of a circle, across the bottom of the communication corridor in the connecting conduit. The blocking dam effectively blocks off the lower portion of the cross-section of the communication corridor, and thus effectively prevents movement of the bait stick past the dam and out of the connector conduit at open end 32. Where feeding conduits are used on opposing sides/ends of the connecting conduit, a corresponding blocking member is positioned at a corresponding location between the bait stick and the open end 36 at the opposing end of the connector conduit.

Figure 5:
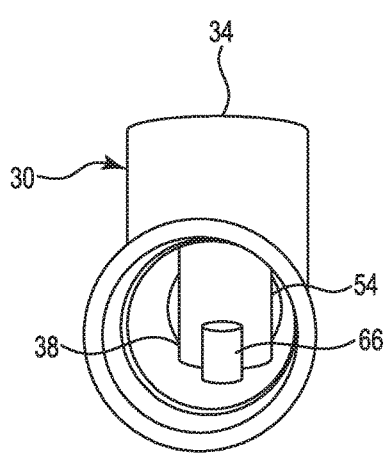
FIG. 5 is an end view of the T-section showing a post as a blocking member, and the lower end of a bait stick behind the post.

FIG. 5 shows the T-section connector conduit 30 having a blocking member in the form of a post 66 extending up from the bottom of the communication corridor in the connecting conduit. The bottom end of a bait stick is shown at the feeding location 38. The blocking member effectively prevents/blocks movement of the bait stick past the post and out of the connector conduit at open end 32. Unless the opposing end of the connector conduit is to be capped, a corresponding blocking member is positioned at a corresponding location between the bait stick and the open end 36 at the opposing end of the connector conduit.

While only a pin, a post, and a chord have been illustrated, a wide variety of structures are contemplated for the blocking member, including wire-based structures such as woven or twisted wire structures, for example chicken wire or what is known as hardware cloth. The critical features are that the blocking member effectively prevent a feeding animal from moving the lower end of the elongate bait stick past the blocking member, while allowing the animal to extend its head to the bait sufficient to feed on the bait. Such structure effectively allows the animal to feed on the bait while preventing the animal from carrying the bait out of the bait station, except whatever amount of the bait the animal consumes.

The blocking function/feature of the invention is most effective when the length of the bait stick exceeds the diameter or other cross-section of the connector conduit. In such instance, the portion of the length of the bait stick which extends up into the food reserve conduit becomes impacted against a side of the food reserve conduit if the lower end of the bait stick is moved laterally toward the blocking member, whereby the length of the bait stick cooperates with the sidewall of the food reserve conduit to prevent the lower end of the bait stick from being moved laterally from the feeding location, prevents the lower end of the bait stick from moving very far toward the opening which leads out of the bait station before the upper end of the bait stick becomes impacted against the side wall of the food reserve conduit.

Thus, as illustrated in the respective FIGURES, the length of the bait stick, in combination with the angle of the T-section, by upper portions of the bait stick becoming impacted against the inner surface of the food reserve conduit, where the cross-section of the bait stick fits closely against the walls of the food reserve conduit, serves as its own obstacle to movement of the lower end of the bait stick toward an exit opening of the bait station, independent of any blocking function of any blocking member.

While the feeding conduits have been illustrated as straight, with anchor pins extending across the feeding conduits in order to block removal of the bait stick, the feeding conduits can be curved, or can have elbows, corners, or the like such that the curvature, or corners, of the feeding conduits take the place of the blocking members to prevent removal of the bait stick from the bait station.

As used herein and in the claims which follow, a hole 40 or 42 recited as extending through a sidewall of a feeding conduit can as well extend through a sidewall of the connector conduit and be considered as an equivalent hole within the scope of the appended claims.

Similarly, while the teaching and claims herein refer to a feeding conduit, a food reserve conduit, and a connector conduit as separate and distinct elements, bait stations of the invention can as well be fabricated as a single e.g. molded plastic unit, with a cap as the only other member of the bait station, whereby the feeding conduit(s) and the food reserve conduit are part of one and the same molded article of manufacture. Such one-piece molded units are to be considered as the equivalent of the assemblies described herein where the feeding conduits, the food reserve conduit, and the connector conduit are separate and distinct elements, such molded units being within the scope of the appended claims.

The invention is not limited in its application to the details of construction, or to the arrangement of the components set forth in the above description or illustrated in the drawings. The invention is capable of other embodiments or of being practiced or carried out in various other ways. Also, it is to be understood that the terminology and phraseology employed herein is for purpose of description and illustration and should not be regarded as limiting. Like reference numerals are used to indicate like components.

Having thus described the invention, what is claimed is:
1. An animal bait station body, comprising:
   (a) at least a first feeding conduit, having a first sidewall, said first sidewall extending about a first communication corridor, said first feeding conduit having a first top and a first bottom, and a first open end;
   (b) a food reserve conduit, having a second sidewall, extending in a direction upward from a feeding location proximate said first feeding conduit and about a second communication corridor, said food reserve conduit having a second end remote from the feeding location;
   said feeding location being defined by a feeding chamber structure, said feeding chamber structure having a third sidewall, said first and second communication corridors extending in common through said first feeding conduit, said food reserve conduit, and through said feeding chamber structure, along a communication path such that any bait material in said food reserve conduit can move, along said communication path, from an initial location in said food reserve conduit, to the feeding location; and
   (c) at a first longitudinal location, a first hole through one of said first sidewall of said first feeding conduit or said third sidewall of said feeding chamber structure, between the feeding location and the first open end, the first hole extending, from outside said animal bait station body, through the one of said first sidewall or said third sidewall and into the communication path, and
   (d) a second hole across the communication path from the first hole, and at the first longitudinal location, the second hole extending through said respective one of said first sidewall or said third sidewall to ambient environment outside said animal bait station body,
   further comprising a blocking member extending through the first hole, and in a downward direction across the communication path, and through the second hole.
2. An animal bait station body as in claim 1, a single straight line axis extending through both of said first and second holes.
3. An animal bait station body as in claim 1, said blocking member, at a given location between the feeding location and the first open end, dividing a cross-section of the communication path into first and second cross-section portions on opposing sides of said blocking member, each of said cross-section portions extending from a first location between said blocking member and the first open end, longitudinally along the communication path, past said blocking member, to a second location between said blocking member and the feeding location,
   a cross-section of said first feeding conduit, in combination with said blocking member, being sized and configured to allow a target animal to get its head past said blocking member such that the head of the target animal is able to reach, and to feed on, the bait material at the feeding location beyond the blocking member, while not allowing the target animal to freely traverse an entirety of a body of the target animal past said blocking member.
4. An animal bait station body as in claim 3, the bait material further comprising a bait stick in the communication path, a lower end of said bait stick abutting said third sidewall at the feeding location, positioning of said blocking member, in combination with a configuration of said bait stick, effectively preventing removal of said bait stick from said bait station past said blocking member.

5. An animal bait station body as in claim 1, further comprising a second feeding conduit, defined by a fourth sidewall extending about a third communication corridor, the communication path extending through said third communication corridor, said second feeding conduit having a third top and a third bottom, and a third end, open and remote from the feeding location, said second feeding conduit extending from the feeding location to the third open end, a third hole being defined at a second different longitudinal location along a length of said third communication corridor, the third hole extending, from outside said animal bait station body, through one of said fourth sidewall of said second feeding conduit or said third sidewall of said feeding chamber structure, and into the third communication corridor, a fourth hole across the third communication corridor from the third hole and at the second longitudinal location, the fourth hole extending, from inside the third communication corridor, through said respective one of said fourth sidewall or said third sidewall to ambient environment outside said animal bait station body.
6. An animal bait station body as in claim 5, the fourth hole being axially aligned with the third hole.
7. An animal bait station body as in claim 5, further comprising a second blocking member extending through the third hole, and in a downward direction across the third communication corridor and into the fourth hole.
8. An animal bait station body as in claim 7, said second blocking member, at a given location between the feeding location and the third open end, dividing a cross-section of the third communication corridor into at least first and second cross-section portions on opposing sides of said blocking member, each of the first and second cross-section portions extending from a first location between said second blocking member and the third open end, longitudinally along the communication corridor, past said second blocking member to a second location between said second blocking member and the feeding location,
   a cross-section of said second feeding conduit, in combination with said second blocking member, being sized and configured to allow a target animal to get its head past said second blocking member such that the head of the target animal is able to reach, and to feed on, a bait at the feeding location beyond the second blocking member, while not allowing the target animal to freely traverse an entirety of a body of the target animal past said second blocking member.
9. An animal bait station kit, comprising:
   (a) at least a first feeding conduit, defined by a first sidewall extending about a first communication corridor, said first feeding conduit having a first top and a first bottom, and first and second open ends;
   (b) a food reserve conduit, defined by a second sidewall extending about a second communication corridor, said food reserve conduit having third and fourth open ends, and being adapted to be assembled, with said first feeding conduit, in providing an animal bait station, and to extend, in such assembly, upward from an elevation of said first feeding conduit to the fourth end, and having a height between the third and fourth ends;
   (c) a connector conduit having a second top and a second bottom, said connector conduit being defined by a plurality of walls, said connector conduit having a plurality of open ends, said plurality of walls extending about a plurality of connector communication corridors, at least first and second ones of said connector communication corridors meeting at at least one corridor junction, a first open end of said plurality of open ends, of a first wall of said plurality of walls of said first connector communication corridor being adapted to receive the second open end of said first feeding conduit, and a second open end of said plurality of open ends, of a second wall of said plurality of walls of said second connector communication corridor being adapted to receive the third open end of said food reserve conduit, a feeding location being defined in said connector conduit;

wherein, when said animal bait station kit is assembled into the animal bait station, a communication path extends through both said first feeding conduit and said connector conduit, (d) at least one blocking member extending across the communication path between the feeding location and the first open end, and also extending down from the second bottom of said connector conduit or the first bottom of said first feeding conduit so as to anchor said bait station to underlying soil.

10. A bait station kit as in claim 9, further comprising a cap adapted to be removably mounted over, and thus to close, the fourth open end of said food reserve conduit.

11. A bait station kit as in claim 9, the first communication corridor, the second communication corridor, and said at least first and second ones of the plurality of connector communication corridors in said connector conduit which receive said first feeding conduit and said food reserve conduit extending in common with each other as the communication path, such that bait material in said food reserve conduit can move, along said second communication corridor, from an initial location in said food reserve conduit, to the feeding location.

12. An animal bait station kit as in claim 9, said at least one blocking member extending across the communication path, from proximate a top of the communication path to approximately a bottom of the communication path.

13. An animal bait station made from an animal bait station kit as in claim 9, said animal bait station comprising a bait station housing comprising said first feeding conduit, said food reserve conduit, and said connector conduit, wherein said at least one blocking member extends through a first hole proximate the first top of said first feeding conduit or the second top of said connector conduit, downwardly across the communication path and out of said feeding conduit or said connector conduit through a second hole proximate a respective one of said first bottom of said first feeding conduit or said second bottom of said connector conduit.

14. An animal bait station kit as in claim 9 wherein said at least one blocking member is positioned in the communication path so as to divide a cross-section of the communication path into first and second cross-section portions and wherein at least one of the first and second cross-section portions is large enough, and said at least one blocking member is close enough to the feeding location, to allow a head of a target animal for which said bait station kit was intended, to reach and feed at the feeding location, each of said cross-section portions extending from a first location between said at least one blocking member and the first open end, longitudinally along the communication path, past said at least one blocking member, to a second location between said at least one blocking member and the feeding location, a cross-section of said first feeding conduit, in combination with said at least one blocking member, being sized and configured to allow the target animal to get its head past said at least one blocking member such that the head of the target animal is able to reach, and to feed on, a bait at the feeding location beyond the at least one blocking member, while not allowing the target animal to freely traverse an entirety of a body of the target animal past said at least one blocking member.

15. An animal bait station kit as in claim 9, further comprising a second feeding conduit, defined by a third sidewall extending about an additional communication corridor, said second feeding conduit having a top and a bottom, and fifth and sixth open ends, and being adapted to be mounted, at the fifth open end of said second feeding conduit, to the connector conduit at a third open end of the plurality of open ends of the connector conduit, and to extend from the third open end of the connector conduit, adjacent the feeding location, to the sixth open end of said second feeding conduit, said communication path extending through both of said first and second feeding conduits.

16. An animal bait station kit as in claim 15, said at least one blocking member comprising a second blocking member, adapted to being inserted into the communication path between the feeding location and the sixth open end of said second feeding conduit, and to extend downwardly below said second feeding conduit so as to further anchor said bait station to the underlying soil.

17. An animal bait station kit as in claim 16, said second blocking member, when so inserted, extending across said second feeding conduit or said connector conduit, from proximate the top of the additional communication corridor or the second top of said second communication corridor to proximate a respective one of the bottom of the additional communication corridor or the second bottom of said second communication corridor.

18. An animal bait station kit as in claim 16, said second blocking member, when so inserted, extending downwardly through a third hole in said second feeding conduit or said connector conduit, across the communication path and out of the second feeding conduit through a fourth hole, and further extending beyond a respective one of the bottom of said second feeding conduit or the second bottom of said connector conduit far enough to be effectively used to anchor said animal bait station to the underlying soil such that said animal bait station is not easily moved laterally from such anchorage.

19. An animal bait station kit as in claim 16 wherein said second blocking member can be positioned so as to divide the communication path into first and second path segments on opposing sides of said blocking member, each of said path segments extending from a first location between said second blocking member and the sixth open end, longitudinally along the communication path, past said second blocking member, to a second location between said second blocking member and the feeding location, a cross-section of said second feeding conduit, in combination with said second blocking member, being sized and configured to allow a target animal to get its head past said second blocking member such that the head of the target animal is able to reach, and to feed on, a bait at the feeding location beyond the second blocking member, while not allowing the target animal to freely traverse an entirety of a body of the target animal past said second blocking member.

20. An animal bait station kit as in claim 19, said connector conduit having a height between the second top and the second bottom, further comprising a single monolithic elongate bait stick adapted to be received into the food reserve conduit and wherein, when so received in the food reserve conduit, said elongate bait stick has an upper portion which extends upwardly to an upper end thereof in said food reserve conduit and a lower portion which extends downwardly to a lower end thereof, whereby a lower end of said bait stick abuts the second bottom of said connector conduit, and an upper portion of said elongate bait stick extends upwardly along the height of the connector conduit and into the food reserve conduit to at least half the height of the food reserve conduit, the upper portion of said bait stick, in said food reserve conduit, being restricted in lateral movement by the second sidewall of said food reserve conduit, lateral movement of said elongate bait stick being not restricted by any abutment with any structure within the feeding location when the lower portion of said bait stick is urged laterally toward said first open end of said first feeding conduit or said sixth open end of said second feeding conduit, said first and second feeding conduits being devoid of bait, the only openings, in said animal bait station whereby a target animal may reach the feeding location, being at said first open end of said first feeding conduit and said sixth open end of said second feeding conduit.

21. An animal bait station as in claim 9, said at least one blocking member dividing the communication path into first and second path segments on opposing sides of said at least one blocking member, each of said path segments extending longitudinally past said at least one blocking member, further comprising a bait stick in said food reserve conduit, said bait stick having a length, and a cross-section across the length of said bait stick, said cross-section, in combination with the length of said bait stick, preventing said bait stick from being moved past said at least one blocking member through either of the first or second path segments of the communication path.

22. An animal bait station, comprising:
(a) a bait station housing, comprising
 (i) at least a first feeding conduit, defined by a first sidewall extending about a first communication corridor, said first feeding conduit having a first top, a first bottom, and a first open end,
 (ii) a generally uprightly-extending member comprising a food reserve conduit defined by a second sidewall extending about a second communication corridor, said food reserve conduit extending away from said first feeding conduit, said food reserve conduit having a third end proximate said first feeding conduit and a fourth end remote from said first feeding conduit, and a food reserve conduit height between the third end and the fourth end,
 (iii) a feeding location in a feeding chamber structure being defined proximate a locus of closest approach of said first feeding conduit and said food reserve conduit, said feeding chamber structure having a feeding chamber structure top wall at a generally same elevation as the first top of said first feeding conduit, and a feeding chamber structure bottom wall, and a height between the feeding chamber structure top wall and the feeding chamber structure bottom wall, said food reserve conduit having a second end remote from the feeding location; and
(b) a blocking member between the feeding location and the first open end of said first feeding conduit,
the first and second communication corridors defining a communication path having a length extending through said first feeding conduit, said food reserve conduit, and said feeding location, said blocking member extending across the communication path, at a given location along the communication path, said blocking member dividing the communication path into first and second path segments on opposing sides of said blocking member at the given location, each of said first and second path segments extending longitudinally from a first location between said blocking member and the first open end, along the communication path, past said blocking member to a second location between said blocking member and the feeding location, a cross-section of said first feeding conduit, in combination with said blocking member, being sized and configured to allow a target animal to gets head past said blocking member such that head of the target animal is able to reach, and to feed on, a bait at the feeding location beyond the blocking member, while not allowing the target animal to freely traverse an entirety of a body of the target animal past said blocking member.

23. An animal bait station as in claim 22, said blocking member effectively blocking removal of the bait comprising a bait stick from said feeding chamber through the first feeding conduit.

24. An animal bait station as in claim 22, said blocking member extending downwardly, from an upper portion of the first communication corridor to a lower portion of the first communication corridor.

25. An animal bait station as in claim 22, an anchor segment of said blocking member extending down from said bait station housing to anchor said bait station to underlying soil.

26. An animal bait station as in claim 22, wherein said blocking member extends through a first hole in one of said first feeding conduit or said feeding chamber structure between the feeding location and the first open end, and out of said bait station housing through a second hole axially aligned with the first hole.

27. An animal bait station as in claim 22, wherein the bait further comprises a single monolithic elongate bait stick in said bait station, a lower end of said bait stick abutting said feeding chamber structure bottom wall, and extending upwardly into said food reserve conduit at least half the height of said food reserve conduit, the configuration of said elongate bait stick, in combination with positioning of said blocking member, effectively preventing removal of said elongate bait stick from said bait station past said blocking member.

28. An animal bait station as in claim 27 wherein lateral movement of the lower end of said bait stick is further impeded by said blocking member extending across the communication path generally perpendicular to the communication path so as to generally divide the communication path into said first and second path segments.

29. An animal bait station as in claim 22, further comprising a second feeding conduit, defined by a third sidewall extending about a second communication corridor, said second feeding conduit having a third top and a third bottom, and a third end, open and remote from the feeding location, the second feeding conduit extending from the feeding location to the third open end.

30. An animal bait station as in claim 29, further comprising a second blocking member in the second communication corridor between the feeding location and the third open end of said second feeding conduit, said communication path including the second communication corridor, said second blocking member extending across the communication path at a second given location, the second blocking member dividing the communication path into third and fourth path segments on opposing sides of said second blocking member at the second given location, each of said third and fourth path segments extending longitudinally from a third location between said second blocking member and the third open end, along the communication path, past said second blocking member to a fourth location between said second blocking member and the feeding location,
  a cross-section of said second feeding conduit, in combination with said second blocking member being sized and configured to allow the target animal to get its head past said second blocking member such that the head of the target animal is able to reach, and to feed on, the bait at the feeding location beyond the second blocking member, while not allowing the target animal to freely traverse the entirety of the body of the target animal past said second blocking member.

31. An animal bait station as in claim 30, said second blocking member extending from proximate the third top of the second feeding conduit to proximate the third bottom of the second feeding conduit.

32. An animal bait station as in claim 31, an anchor segment of said second blocking member extending down from one of the third bottom of the second feeding conduit or the feeding chamber structure bottom wall to anchor said bait station to underlying soil.

33. An animal bait station as in claim 31, wherein said second blocking member extends through a third hole in said second feeding conduit or said feeding chamber structure, across the communication path and out of said second feeding conduit or said feeding chamber structure through a fourth hole axially aligned with the third hole, and extends down from the bait station housing so as to anchor said bait station to underlying soil such that said bait station is not easily moved laterally from a location at which said animal bait station is anchored to the underlying soil.

34. An animal bait station as in claim 30, further comprising a monolithic elongate bait stick in the communication corridor, said elongate bait stick having an upper portion which extends upwardly to an upper end of said bait stick in said food reserve conduit and a lower portion, below said food reserve conduit, said lower portion extending downwardly to a lower end of said elongate bait stick which abuts said feeding chamber structure bottom wall, said elongate bait stick extending upwardly from said feeding chamber structure bottom wall, across the full height of said feeding chamber structure, and upwardly into the food reserve conduit to at least half the height of said food reserve conduit, the upper portion of said elongate bait stick, in said food reserve conduit, being restricted in lateral movement by the second sidewall of said food reserve conduit, lateral movement of said elongate bait stick being not restricted by any abutment with any structure within the feeding location, said first feeding conduit being devoid of bait, the only opening whereby the target animal may reach the feeding location being at said open end of said first feeding conduit.

35. An animal bait station as in claim 34 wherein lateral movement of the lower end of said bait stick is further impeded by said blocking member extending across the communication path generally perpendicular to the communication path so as to generally divide the communication path into said first and second path segments which comprise first and second half sections.

36. An animal bait station as in claim 22, wherein the bait further comprises a single monolithic elongate bait stick in said bait station, said elongate bait stick having an upper portion which extends upwardly to a fifth upper end thereof in said food reserve conduit and a lower portion, below said food reserve conduit, said lower portion extending downwardly to a sixth lower end thereof at said feeding location, said monolithic elongate bait stick being urged downwardly by gravity such that the sixth lower end of said elongate bait stick abuts said feeding chamber structure bottom wall at the feeding location, said elongate bait stick extending upwardly from said feeding chamber structure bottom wall, into said food reserve conduit to at least half the height of said food reserve conduit at the fifth upper end of said bait stick, the upper portion of said elongate bait stick, in said food reserve conduit, being restricted in lateral movement by the second sidewall of said food reserve conduit, lateral movement of said elongate bait stick being not restricted by any abutment of the lower portion of said elongate bait stick with any structure of said bait station housing when the lower portion of said elongate bait stick is urged laterally toward said fir open end of said at least first feeding conduit,
  said at least first feeding conduit being devoid of bait,
  the only opening, in said animal bait station, whereby the target animal may reach the feeding location being at said fir open end of said first feeding conduit.

37. An animal bait station, comprising:
  (a) a bait station housing, comprising
    (i) at least a first feeding conduit, having a first length and a first cross-section, said first feeding conduit being defined by a first sidewall extending about a first communication corridor, the first communication corridor having a first length, a first top and a first bottom, said first feeding conduit having a first open end and a second end;
    (ii) a generally upwardly-extending member comprising a food reserve conduit defined by a second sidewall extending about a second communication corridor, the second communication corridor having a second length, a second cross-section being defined across the second communication corridor, said food reserve conduit extending away from said first feeding conduit, said food reserve conduit having a third end proximate said first feeding conduit and a fourth end remote from said first feeding conduit, and a food reserve conduit height between the third end and the fourth end;
    (iii) a feeding location in a feeding chamber structure, said feeding chamber structure extending between said second end of said first feeding conduit and said third end of said food reserve conduit, said feeding chamber structure having a second top and a second bottom, and a second height between the second top and the second bottom; and
  (b) a single monolithic elongate bait stick, said elongate bait stick having an upper portion which extends upwardly to a fifth upper end thereof in said food reserve conduit and a lower portion, below said food reserve conduit, which lower portion extends downwardly to a sixth lower end of said elongate bait stick in said feeding chamber structure, said monolithic elongate bait stick being urged downwardly by gravity such that the sixth lower end of said elongate bait stick abuts the second bottom of said feeding chamber structure, said elongate bait stick having a third length defined between the fifth upper end and the sixth lower end, said elongate bait stick extending upwardly from the second bottom of said feeding chamber structure, across the full second height of said feeding chamber structure, and upwardly into said food reserve conduit to at least half the height of said food reserve conduit, the upper portion of said bait stick, in said food reserve conduit, being restricted in lateral movement by the second sidewall of said food reserve conduit, lateral movement of the lower portion of said elongate bait stick being not restricted by any abutment with any structure within the feeding location when the lower portion of the bait stick is urged laterally toward said open end of said first feeding conduit, said at least first feeding conduit being devoid of bait, the only opening, in said animal bait station, whereby a target animal may reach the feeding location being at said open end of said first feeding conduit.

38. An animal bait station as in claim 37, further comprising a blocking member extending across the first communication corridor between the first open end of said first feeding conduit and the feeding location from proximate the first top of the first communication corridor to proximate the first bottom of the first communication corridor.

39. An animal bait station as in claim 37, the first and second communication corridors defining a common communication path extending through the first feeding conduit and the food reserve conduit, a blocking member being defined in the communication path between the feeding location and the first open end, said blocking member being positioned so as to divide a cross-section of the communication path, between the first open end of said first feeding conduit and the feeding location, into first and second cross-section portions and wherein at least one of the first cross-section portion or the second cross-section portion is large enough, and said blocking member is close enough to the feeding location, to allow a head of an animal for which the bait station was intended, to reach and feed at the feeding location, each of said cross-section portions extending from a first location between said blocking member and the first open end, longitudinally along the communication path, past said blocking member, to a second location between said blocking member and the feeding location, a cross-section of said first feeding conduit, in combination with said blocking member, being sized and configured to allow a target animal to get its head past said blocking member such that the head of the target animal is able to reach, and to feed on, said elongate bait stick at the feeding location beyond said blocking member, while not allowing the target animal to freely traverse an entirety of a body of the target animal past said blocking member.

40. An animal bait station as in claim 39, wherein a configuration of said bait stick, in combination with positioning of said blocking member, provides an effective second obstacle to removal of said bait stick from said bait station past said blocking member.

41. An animal bait station, comprising:
(a) a bait station housing, comprising
  (i) at least a first feeding conduit having a first length and a first cross-section, said first feeding conduit being defined by a first sidewall extending about a first communication corridor, the first communication corridor having a first length, a first top and a first bottom, and a first height between the first top and the first bottom, said first feeding conduit having a first open end and a second end,
  (ii) a generally upwardly-extending food reserve conduit defined by a second sidewall extending about a second communication corridor, the second communication corridor having a second length, a second cross-section being defined across the second communication corridor, said food reserve conduit having a third end proximate said first feeding conduit and a fourth end remote from said first feeding conduit, and a food reserve conduit height between the third end and the fourth end,
  (iii) a feeding location being defined by a feeding chamber structure, said feeding chamber structure having a second top and a second bottom, and a second height between the second top and the second bottom,
  the first and second communication corridors extending in common through said first feeding conduit, said feeding location, and said food reserve conduit, along a communication path having a third length extending collectively through said first feeding conduit, said food reserve conduit, and said feeding location, the feeding chamber structure having a third top and a third bottom, and
  (iv) a blocking member extending across the communication path, thereby dividing the communication path into first and second path segments on opposing sides of said blocking member, and
(b) a single monolithic elongate bait stick, said elongate bait stick having an upper portion which extends upwardly to a fifth upper end thereof in said food reserve conduit and a lower portion, below said food reserve conduit, said lower portion extending downwardly to a sixth lower end thereof at said feeding location, said monolithic elongate bait stick being urged downwardly by gravity such that the sixth lower end of said elongate bait stick abuts said third bottom of said feeding chamber structure at the feeding location, said elongate bait stick having a third length defined between the fifth upper end and the sixth lower end, said elongate bait stick extending upwardly from the bottom of said bait station housing, into said food reserve conduit to the fifth end thereof corresponding to at least half the height of said food reserve conduit, the upper portion of said elongate bait stick, in said food reserve conduit, being restricted in lateral movement by the second sidewall of said food reserve conduit, lateral movement of the lower portion of said elongate bait stick being not restricted by any abutment with any structure of said bait station housing with the lower portion of said elongate bait stick when the lower portion of said elongate bait stick is urged laterally toward said open end of said at least first feeding conduit, said at least first feeding conduit being devoid of bait, the only opening, in said bait station housing, whereby a target animal may reach the feeding location being at said first open end of said at least first feeding conduit.

42. An animal bait station as in claim 41, an anchor segment of said blocking member extending down from said bait station housing and anchoring said bait station to underlying soil.

43. An animal bait station as in claim 41, wherein said blocking member extends through a first hole in said bait station housing between the feeding location and the first open end, downwardly across the communication path, and out of said bait station housing through a second hole below the first hole.

* * * * *